Oct. 27, 1925.

E. G. LACEY

BORING MACHINE

Filed Sept. 3, 1924

Inventor:
Ernest G. Lacey
By Kent N. Wonnell Atty

Oct. 27, 1925.

E. G. LACEY

BORING MACHINE

Filed Sept. 3, 1924

Inventor:
Ernest G. Lacey

Oct. 27, 1925. 1,559,263

E. G. LACEY
BORING MACHINE
Filed Sept. 3, 1924  4 Sheets-Sheet 4

Patented Oct. 27, 1925.

1,559,263

UNITED STATES PATENT OFFICE.

ERNEST GEORGE LACEY, OF RICHMOND, VICTORIA, AUSTRALIA.

BORING MACHINE.

Application filed September 3, 1924. Serial No. 735,576.

*To all whom it may concern:*

Be it known that I, ERNEST GEORGE LACEY, a subject of the King of Great Britain, of 229 Punt Road, Richmond, Victoria, Australia, have invented certain new and useful Improvements in Boring Machines; and I do hereby declare the following to be a full, clear, and exact description of the invention, such as will enable others skilled in the art to which it appertains to make and use the same.

This invention relates to improvements in boring machines and refers especially to machines for boring holes in wood to accommodate dowels for connecting two pieces of wood in articles made by furniture makers, cabinet makers and other wood workers.

Hitherto it has been customary to employ machines having a plurality of boring bits supported by spindles driven by intermeshing gear wheels whereby two or more holes can be formed simultaneously and at desired distances apart. The main purpose of employing a number of boring bits is that by this means the holes bored in one piece of wood will register accurately with those in the piece of wood to be joined thereto by dowels and to obviate the difficulty and loss of time in marking and boring the holes singly.

When more than one bit is used provision is made for adjusting one or other of them so that the distances between the holes can be regulated as desired.

A disadvantage of the ordinary boring machines having multiple bits is that the gearing for operating the spindles cannot be made small enough (without sacrificing necessary strength) to enable the bits to be worked as close together as is sometimes required.

The object of the present invention is to provide a simply constructed and easily operated boring machine by means of which a plurality of holes can be bored in a number of pieces of wood so that when placed together the holes in one piece will register accurately with the holes in the other piece and the said holes can be bored as closely together as may be required.

I accomplish the above mentioned object by providing a machine wherein a bit is carried by a spindle rotatively supported in a sliding sleeve which is mounted in a transversely movable member and wherein means are provided for reciprocating the bit and sleeve and for actuating the said movable member a predetermined amount to align the spindle with slots or gaps in a gauge or index bar so as to enable holes to be bored at required distances apart.

The movable member supporting the boring spindle may be pivoted on a shaft having fast and loose belt pulleys and a pulley connected by a belt to a pulley on the said boring spindle. The machine is provided with an adjustable table having depressible stops capable of a wide range of adjustment and fence for correctly locating the work with respect to the bit. Alternatively the lower end of the movable member can be formed with curved quadrants adapted to mesh with the teeth of horizontal racks whereby the boring spindle will move in a horizontal line.

Other features embodied in the invention will be readily understood from the following description.

In order that the invention may be readily understood reference will now be had to the accompanying sheets of explanatory drawings, wherein:—

In these drawings like characters of reference have been employed to indicate the same or coresponding parts in the different views and the numeral 15 designates a frame through the lower part of which passes a fixed shaft 16 upon which is pivotally supported the lower end of a substantial lever or arm 17.

The framing 15 comprises a front and rear part which are adapted to be bolted or otherwise firmly secured to the floor of a workshop or factory or to a suitable foundation. The shaft, preferably, is made of tubular formation, as shown, and passes through a boss 18 on the rear part and into a boss 19 on the front part of the framing.

The lower part of the lever or arm 17 is mounted on the tubular shaft 16 between the front and rear parts of the frame 15 and the rear end of the said tubular shaft extends beyond the rear of the said framing. The extension on the shaft 16 is provided with rotatively mounted belt pulleys 20, 21 and 22 which are retained in position on the said shaft by means of a collar or nut 23.

A belt fork 24 is formed on a rod 25 which is mounted on an arm projecting from a rod 26 which is slidably mounted within the tubular shaft 16.

The pulleys 21 and 22 are of the same diameter and the belt fork is adapted to be actuated to place a belt on one or other of the said pulleys by operating a foot lever 27 provided with heel and toe pieces and fixedly secured to the end of an oscillating rod 28.

The tubular shaft 16 is formed with a slot 29 on one side and a pin 29' having one end secured to the rod 26 passes through the said slot, and is connected by a link 30 to an arm 31 rigidly secured to and projecting upwardly from the rod 28.

The pulley 21 is formed integrally with the pulley 20 which is of larger diameter, and the pulley 22 is adapted to rotate on the extension of the tubular shaft independently of the other pulleys. The pulley 21 which is formed integrally with the large pulley 20 forms a fast or driving pulley and the other pulley 22 is adapted to form a loose pulley, upon which the driving belt 32 may be placed by means of the fork 24 when it is desired to throw the machine out of action.

The lever or arm 17 extends vertically above the fixed shaft passing through the bottom of the frame and the upper end of the said lever or arm is formed with bosses 33, 34, and 35 to accommodate sleeves or bearings carrying a longitudinally disposed boring spindle 36. The boring spindle 36 is fitted with a pulley 37 which is connected by a belt 38 to the pulley 20 having a fixed relationship to the driving pulley 21 on the shaft 16.

The sleeve 39 supporting the front end of the boring spindle extends beyond the front and rear ends of the forward boss 33 on the lever and is adapted to slide freely therein and carry with it the said boring spindle.

The sleeve 39 is provided with a liner 40 of antifrictional metal and the front end of the said sleeve 39 is provided with an antifrictional thrust bearing 41 to ensure freedom of operation.

The boss 33 is provided on its inner periphery with a liner 42 of anti-frictional metal having a plurality of longitudinally disposed radially projecting ribs 43. The periphery of the sleeve 39 is provided with longitudinally disposed grooves 44 which engage the radially projecting ribs on the liner 42 whereby the said sleeve is free to reciprocate longitudinally in the liner secured within the boss 33 and be prevented from rotating therein (see Figure 9 of the drawings).

The sleeve 39 is formed with a rib or feather 45 on its upper side which is adapted to slide freely in a groove 46 formed in the liner within the boss 33.

The forward end of the boring spindle 36 is provided with a head or chuck or is formed with a threaded hole in which may be screwed or otherwise removably secured the end of a drill or bit 47.

A bifurcated lever 48 is pivoted at 48' to the sides of the upper part of the oscillating lever or arm 17 and this bifurcated lever is connected by a link 49 to a stud 50 on that part of the sleeve which projects beyond the front of the oscillating lever. The operating lever is thrust forwardly and rearwardly to permit of boring operations to be performed and the oscillating lever or arm can be swung laterally to adjust the position of the drill to bore holes at predetermined distances on one or both sides of the hole previously bored when the lever or arm occupied a vertical position.

A tension spring 48" connects the upper part of the lever 48 to a rearward part of the lever or arm 17 and this spring is employed to exert a rearward thrust on the upper end of the lever 48 and causes the lever to be returned to its normal position after a boring operation.

The machine framing is provided with brackets 51 upon which is secured a transversely disposed index plate or gauge bar 52 having one or more index slots 53 formed on the underside and corresponding in shape to the rib or feather 45 on the sleeve supporting the front end of the boring spindle.

The rear ends of the slots in the gauge bar are flared and the front end of the rib or feather 45 is tapered from opposite sides towards the centre thereof. The index plate or gauge bar 52 can be made from angle iron bar metal as shown or in any other approved way.

When the boring spindle is in its normal position the forward end of the rib or feather 45 on the sleeve 39 is located at the rear of the gauge bar, and the purpose of forming the slots in the said gauge bars with flared entrances is to enable the tapered front end of the said feather to engage readily with the slots 53 in the gauge bar when the lever 48 is actuated to move the boring spindle in a forward direction.

The gauge bar 52 is supported at the rear of the boss 33 on the front of the oscillating lever or arm and is provided with one or more slots 53 according to the number of holes it is desired to bore in a piece of wood without adjusting the same on the machine.

The ends of the gauge bar are removably secured to the brackets 51 so that it may be easily and quickly changed for a gauge bar having a greater or lesser number of index slots set at different distances apart.

The gauge bar 52 is formed with forwardly opening jaws 56 at the ends which permit the said bars to be readily attached to and detached from vertical studs 57 on the brackets 51 and the gauge bar is retained in a fixed position on the studs by means of winged nuts 58 or the like. The jaws 56 at the ends of the gauge bar permit of it being adjusted forwardly or backwardly to a desired position with respect to the normal position of the rib or feather 45.

The number of and distances between the slots in the gauge bar determine the number and spacing of the holes to be bored.

The lever or arm 17 is adapted to move laterally in either or both directions against buffer springs 54 carried on a rod or rods 55 connected to the frame.

The buffer springs 54 tend to retain the oscillating lever or arm in a vertical position and when moved laterally the tension of the springs is increased and tends to prevent knock or jar when the feather 45 on the sleeve comes in contact with the sides of the slots or gaps 53 in the gauge bars 52.

These buffer springs obviate to a considerable extent any shock or jar that may be occasioned by moving the said oscillating lever or arm laterally against the sides of a gap 15' in the rear part of the main frame 15.

The front of the machine framing is provided with vertical guides 60 supporting a slipper carrying a bracket 61 to which is pivotally mounted a table 62 for supporting the work to be bored.

A vertical adjustment screw 63 is rotatively connected at its upper end to a forwardly projecting part 64 of the table-supporting bracket 61 and the lower end of the said screw is adapted to engage with a screwed hole formed in a vertical sleeve 66 supported in a bracket 67 fitted to the lower part of the frame.

The adjustment screw is provided with a hand wheel 68 or like device whereby the said screw can be rotated to raise or lower the table as desired.

A rod 69 is pivoted to a lug on the centre of a bar 70 passing transversely beneath the table and the opposite end of the rod passes through a screw clamping member 71 fitted to the upper part 64 of the bracket 61, and this clamping member may be loosened to permit of the table to be placed at any desired angle and locked in its adjusted position by operating a lever 72 of the clamping member or other approved device.

The inner edge of the table 62 is provided with a vertical angle iron fence 73 against which the work may be placed and retained at right angles to the boring bit 47.

The surface of the table is provided with transverse slots 74 through which vertical stop pins 75 project upwardly from cross bars 76 movably supported beneath the table. The pins 75 are normally kept pressed above the surface of the table by means of springs 77 and they can be set to support the work in a desired position by effecting a lateral adjustment of the bars supporting the same.

The depressible pins 75 can be located at equal distances from a centre line 68' on the table to guide a piece of wood of given width toward the bit 47. Should a piece of wood of greater width be placed on the table one edge can be placed against the pins 75 on one side of the line 68' and the opposite edge can be forced down upon the second set of pins thereby causing them to be depressed below the surface of the table. Thus when the depressible pins 75 are set to act as guides for pieces of wood of a given size one or other of the two sets of pins will act as a guide should pieces of wood of greater width be placed on the table and the second set will not interfere with the correct adjustment of the work.

The cross bars 76 supporting the depressible pins 75 are connected to transversely disposed bars 78 supported in bosses 79 on the underside of the table and the said bars may be retained fixedly in the bosses by means of set screws 80 or the like.

The transversely disposed slots 74 extend from near the centre of the table almost to the outer ends thereof as shown in the drawings.

Figures 5, 6, 7:
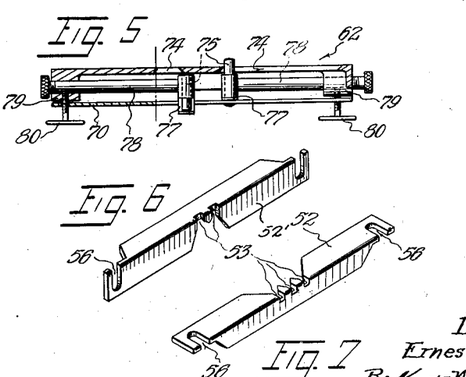
Figure 5 is a view in sectional elevation taken on the dotted line 5—5 of Figure 3.
Figures 6 and 7 are views in perspective of parts of the machine and hereinafter will be fully described.

The metal at the inner ends of the slots is cut away or flared downwardly, as shown in Figure 5, whereby when the pins 75 are pressed downwardly and the bars 78 thrust inwardly the said pins will readily pass beneath the table and be retained therebelow so that no projection whatever will be extending thereabove.

The work 81, (shown in dotted lines in Figure 2) is clamped to the table by means of an arm 82 having an adjustable clamping head 83 and the said arm is carried by a vertically reciprocable rod 84 which is mounted in brackets 85 and 85' on the front of the machine framing.

An upward pressure is maintained on the said vertical rod 84 by means of a spring 86 and a downward pressure is applied to the same by means of a foot operated lever 87 which is pivotally mounted on the rod 28 and is connected by a link 88 to the lower end of the said rod 84.

The arm 82 is adjustably secured to the vertically reciprocable rod 84 by means of a clamping device 82' whereby the said arm can be raised or lowered or adjusted laterally to suit different kinds of work.

The angle iron fence 73 on the rear of the table is fitted with a number of screw clamping devices 90 each having a depressible pin 91 projecting forwardly across the rear part of the said table. The depressible pins are mounted in holes 92 in the clamping devices and are thrust forwardly by springs 93 which are housed in holes 94 at the rear thereof and bear against screw plugs 95 which cover the rear ends of the said holes. The depressible pins 91 can be formed with shoulders 96 to limit their forward movement and to retain them correctly in the holes in the clamping devices.

Alternatively, the inner ends of the depressible pins can be formed with reduced extensions which pass through the screw plugs 95 and terminate in heads 97 adapted to bear against the outer ends of the plugs and so limit the forward movement of the depressible pins. The clamping devices are provided with transverse recesses 98 adapted to fit over the rearwardly projecting flange of the angle iron fence 73 and are retained fixedly in position thereon by set screws 99.

The said clamping devices 90 can be adjusted at predetermined distances apart in the length of the angle iron fence so that when a stile or other long piece of board is moved over the table and the end thereof is pressed successively against the sides of the depressible pins, and secured firmly to the table by the foot operated clamping means 83, holes can be bored in the work at desired points.

The angle iron fence 89 can be extended to any desired distance beyond the sides of the table and be fitted with clamping devices 90 (as shown in dotted lines in Figure 3) so as to permit holes to be bored at predetermined distances apart in the whole length of the work. The said angle iron fence can be provided with graduated markings 89' on both sides of a zero mark located in the same vertical plane as the drill or bit 47 occupies when in its central position and these markings permit the clamping devices 90 to be readily adjusted on the angle iron fence as required.

The top of the table may be provided also with protractor markings 100 in order to enable work to be readily positioned thereon at an angle to permit holes to be bored at the desired angle in the work.

The depressible pins 75 are adjusted as hereinbefore described to permit of the work to be retained at any desired angle to the bit during the boring operation.

In some instances it is found advantageous to bore two holes in the work one above the other in vertical alignment at one setting of the machine. In order to enable this to be accomplished the lower end of the screw 63, for raising and lowering the table, passes through the sleeve 66 which fits slidably in a boss 101 formed on the bracket 67 fitted to the lower part of the frame.

A flange 102 is formed on the upper end of the sleeve 66 and a threaded hole in the rear part thereof is adapted to receive the screwed upper end of a rod 103, the lower end of which passes through a hole 103' formed in the bracket 67. The upper end of the rod 103 is provided with a lock nut 104 to retain it fixedly in position on the flange 102 and the lower end of the rod is formed with a reduced extension 105.

A shoulder on the rod 103 at the upper end of the reduced extension normally rests upon the end of a bolt 106 which is slidably mounted in a bore formed horizontally in the bracket 67.

The bolt 106 is formed with a reduced rearward extension and this reduced portion is fitted with a helical compression spring 107 which is adapted to keep the bolt thrust into the hole 103' and beneath the said shoulder. The rear end of the reduced part of the bolt is connected by a link 108 to the lower end of a lever 109 pivoted at or about its centre on the lever or arm 17, (see Figure 2 of the drawings).

The upper end of the lever 109 is forked to engage a rod which is pivotally connected to a depending fork 110 on one side of the lever 48. The free end of the rod 109' is screw threaded and provided with a nut 111 which can be adjusted to cause it to bear against the fork on the upper end of the lever 48 and the said lever to be actuated to retract the bolt 106 (as shown in dotted lines in Figure 2) when the lever 48 is nearing the limit of its travel in a rearward direction.

The lever 48 need not necessarily be moved to the limit of its travel in a rearward direction to move the feather 45 clear of the index slots in the gauge bar and therefore a plurality of holes can be bored at one elevation in the work and holes at another elevation can be bored when the lever 48 has been operated to release the bolt 106 to permit the table to be lowered as desired.

The nut 111 on the rod is forced to bear against the rear of the fork on the upper end of the lever 109 when the lever 48 is forced rearwardly into its normal position and when the parts are in the position above described and pressure is applied to the foot operated lever 87 the downward thrust applied to the clamping head 83 forces the table and the work thereon downwardly until the front of the flange 102 bears upon a stop pin 112. The said stop pin 112 can be set so that its upper end can be located at any desired distance from the underside of the flange 102 and is locked fixedly in position by a set screw 113. The distance between the underside of the flange 102 and the stop pin 112 determine the distance between the centres of holes formed in vertical alignment in the work.

Figure 1:
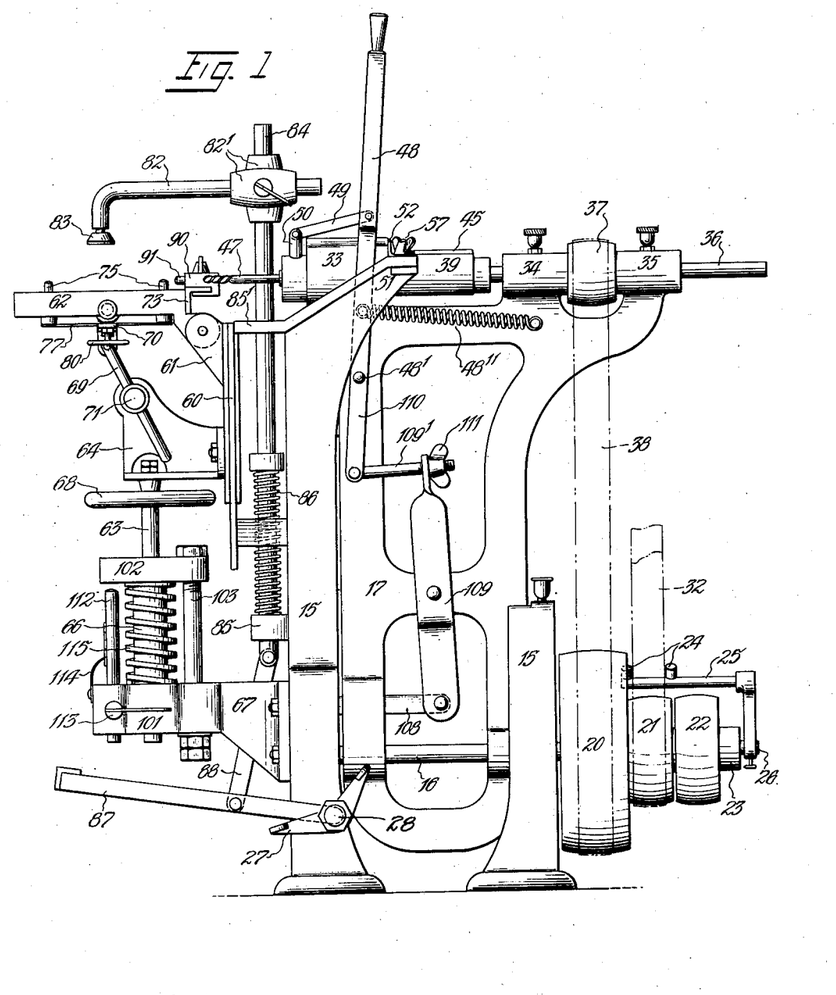
Figure 1 is a view in side elevation of a boring machine constructed in accordance with the present invention.

The front face of the pin 112 can be formed with graduated markings and a pointer or finger 114 can be fitted to the front of the bracket 67 to facilitate the correct vertical adjustment of the said pin, (see Figure 1 of the drawings).

A helical compression spring 115 encircles the sleeve 66 and returns it to its normal position (determined by the position of the nuts on the reduced end of the screwed rod 103) after the second hole has been bored.

When the lever 47 is operated to bore the second or upper hole in the work, the nut 111 on the rod 109' moves away from the upper end of the lever 109 and the compression spring 107 is free to return the bolt 106 to its normal position when the rod 103 has moved upwardly sufficiently far to place the shoulder thereon above the said bolt.

The table can be retained at any desired elevation by means of a set screw 116 which passes through the outer end of the bracket 67 and engages with the sleeve 66, or alternatively, by adjusting the pin 112 and the nuts 111 on the lower end of the rod 103.

Figure 3:
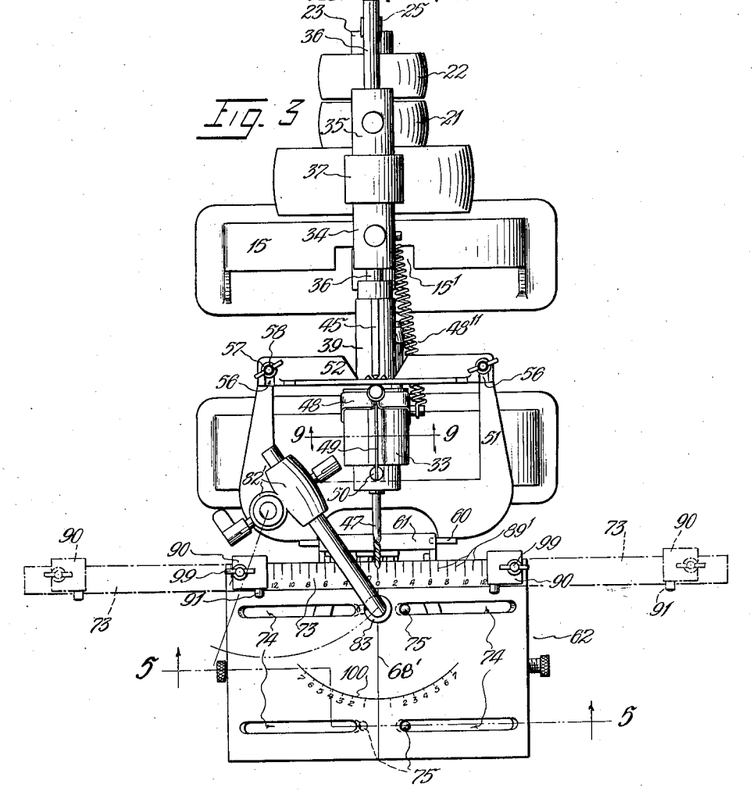
Figure 3 is a view in plan of Figure 1.
Figure 4:
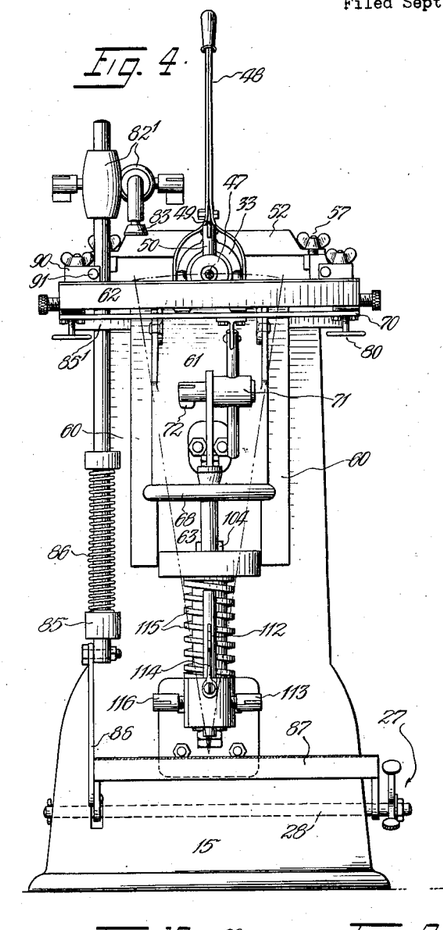
Figure 4 is a view in front elevation of Figure 1.

In Figures 6 and 7, I have shown in perspective, a gauge bar 52' for enabling a pair of holes to be bored at regular distances apart and a second bar 52, as shown in place in Fig. 3 having slots therein so positioned as to enable three holes to be formed at regular distances apart. Those parts of the gauge bar which are located between the slots can be made of even width or of variable widths according as the holes are to be bored at regular distances or irregular distances apart.

Figures 9, 11:
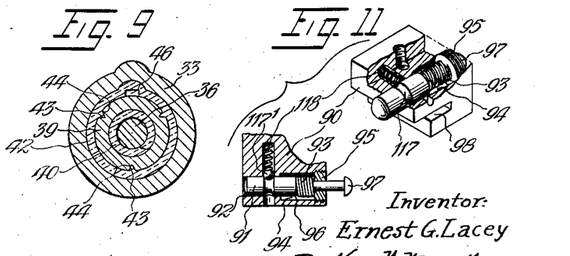
Figure 9 is a view in sectional elevation of part of Figure 3 taken on the dotted line 9—9.
Figure 11 shows two views of a modified form of the adjustable stop shown in Figure 10 and hereinafter will be fully described.
Figure 10:
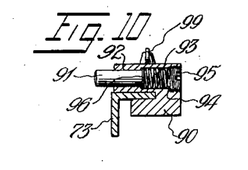
Figure 10 is a view in sectional side elevation of an alternative form of adjustable stop for locating work correctly in the machine.

In the clamping devices shown in Figure 11, means are provided whereby the depressible pins 75 can be retained frictionally in their depressed positions. The said means comprise a circumferential groove 117 in the depressible pins 75 adapted to receive a portion of a metal ball 117' which is thrust theretowards by a spring 118 when the pins are in their depressed positions. When it is desired to place the pins in their normal positions the resistance offered to the spring, by the slot engaging portion of the ball, is readily overcome by striking the head of the reduced part of the pin with the hand or any suitable device.

Figure 12:
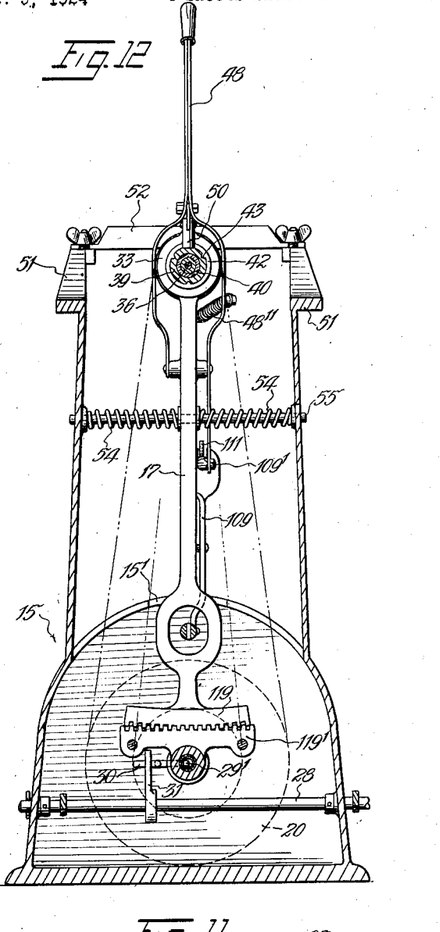
Figure 12 is a view in sectional front elevation showing a modification in means for supporting the oscillating lever or arm of the machine.

In a modification of the invention the lever or arm 17 is formed at its lower end with two or more curved racks 119 having their centres struck from the axis of the boring spindle 36 and the teeth of these curved racks 119 mesh with the teeth of horizontal racks 119' fitted to the framing of the machine.

When the lever or arm 17 is supported on the racks as above described the drill will move in a horizontal path when the lever is swung from side to side as when boring a number of spaced holes in the work placed on the table.

Figure 2:
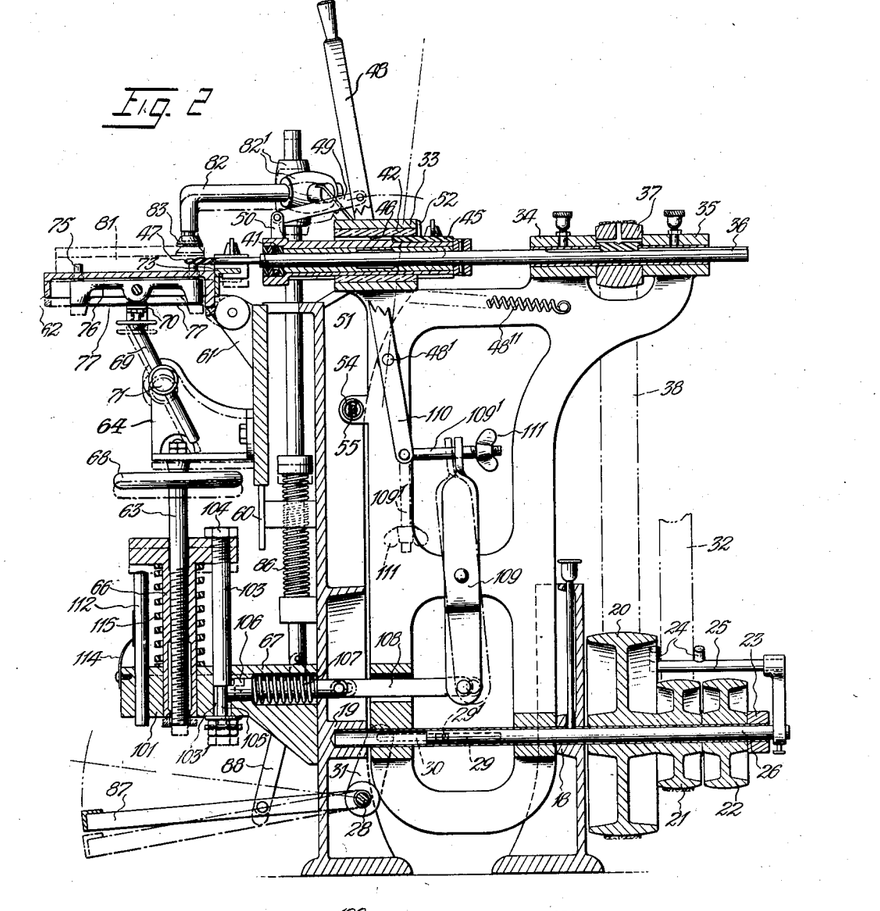
Figure 2 is a view in sectional side elevation of the boring machine.

The advantage of boring the holes in horizontal alignment is that the parts can be readily assembled without necessitating such care as may be required when the holes are bored more or less in a curved line due to the pivoting of the lower end of the arm as shown in Figures 1, 2 and 3 of the drawings.

When the work is so shaped that one end only can be brought to rest upon the top of the table at a time and the other end is disposed at some distance thereabove the clamping devices can be fitted with an adjustable bar 120 having an abutment 121 thereon against which the raised end of the work may be brought to rest so as to correctly locate the opposite end in position for boring.

Figure 8:
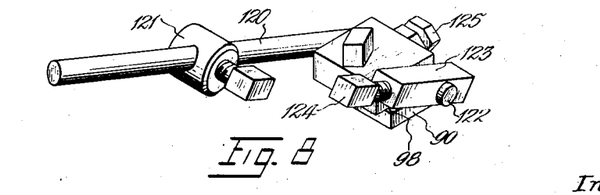
Figure 8 is a view in perspective of an adjustable stop for locating work correctly above the table and in position for boring holes therein as desired.

The means for adjusting the position of the bar 120 with respect to the clamping device consists in forming an angle shaped end 122 on the bar and passing it through a hole formed transversely in the body of the clamping devices and providing the angle shaped end with an adjustable block 123 which can be set by means of a set screw 124 to rest flat upon the table and retain the abutment member on the bar in the position desired, see Figure 8 of the drawings.

The bar 120 can be retained at any desired angle to the table by tightening a set screw 125 which passes through the rear of the clamping device and this set screw can be used together with the adjustable block 123 for retaining the bar in a desired position.

In operation when the work is placed on the table and pressed downwardly thereon by the foot operated clamping means the lever 47 is drawn forwardly to enable the bit to bore a hole. Prior to operating the hand lever 47, the clamping devices are located in their correct positions on the fence and by pressing the stop pins inwardly in succession and moving the work against the next stop pin, holes may be formed at uniform or irregular distances apart in a number of different pieces of furniture and in the parts to be connected thereto so that the said holes will register correctly with each other and with dowels placed therein.

The machine can be employed for making rectangular holes or mortises in wood by substituting a combination hollow square chisel and bit of any well known design and round ended mortises can be made by employing a suitably shaped cutting tool. The mortising tools can be fitted to the spindle 36 or to the sleeve 39 in any approved way.

It will be readily understood that the transversely movable member carrying the boring spindle can be given different designs and that it may be mounted on horizontal tracks or guide rails located transversely at the rear of the table.

By adjusting the operative parts as hereinbefore described the machine can be adapted to different classes of work, and by means of such adjustment, holes may be formed at regular or irregular distances apart in the work in vertical or horizontal alignment.

I claim:—

1. A boring machine comprising a transversely movable member supporting a reciprocating bit carrying spindle, an adjustable work supporting table in front of the transversely movable member, a rib having a fixed relationship with the boring spindle, and a detachable gauge bar having recesses therein adapted to receive the rib and permit the bit carrying spindle to be reciprocated endwise in line with the recesses in the gauge bar upon the lateral adjustment of the said transversely movable member.

2. A boring machine, comprising in combination an oscillatable member, a table in front of the oscillatable member, bearings on the oscillatable member for supporting a reciprocable drill carrying spindle having a bit secured to the forward end thereof, a sleeve fitted to and surrounding the spindle and supported nonrotatively in one of the bearings of the oscillatable member, a feather or key disposed longitudinally on the sleeve, and a transverse member having guide slots therein and constructed and arranged whereby the said slots will determine the points at which the drill spindle can be moved forwardly to bore holes in the work supported on the table.

3. A boring machine comprising in combination a main frame having a table on the front thereof, a shaft supported in the lower end of the main frame, an oscillatable lever having its lower end pivotally supported on the said shaft, bosses on the upper end of the said oscillatably supported lever, a bit carrying spindle rotatively mounted in the bosses, a sleeve mounted to reciprocate in the boss on the front of the oscillatable lever and adapted to rotatively support the front end of the drill carrying spindle, means for reciprocating the sleeve and spindle in the bosses on the oscillatable lever, a feather fitted to or formed longitudinally on the sleeve, and a detachable gauge bar having one or more slots spaced at equal or unequal distances apart therein whereby when the work is placed on the table and the drill carrying spindle is moved rearwardly the feather on the said sleeve can be brought into alignment with the slots in the guide member so as to permit the drill spindle to be brought forward and the bit carried thereby to bore holes in the work in alignment with the said slots in the guide member.

4. In a boring machine the combination of a main frame having a table on the front thereof, a shaft supported in the lower end of the main frame, an oscillatable lever having its lower end pivotally supported on the said shaft, a bit carrying spindle rotatively mounted in the upper end of the oscillatable lever, an extension on the rear end of the shaft, a pulley rotatively mounted on the extension of the shaft connected by a belt to a pulley fitted to the bit carrying spindle, a smaller pulley formed integrally with the first mentioned pulley and adapted to take a driving belt, and a third pulley rotatively mounted on the said shaft adapted to rotate independently of the first mentioned pulley.

5. In a boring machine, a main frame, a shaft supported near the bottom of the main frame, an oscillatable lever pivotally supported at its lower end on the shaft, bosses on the upper end of the lever, a sleeve slidably mounted in the boss on the front of the said lever, a bit carrying spindle rotatively mounted in the sleeve and bosses on the rear of the oscillatable lever, a forked lever pivotally connected to the oscillatable lever or arm, a connection between the upper end of the said lever and the forward end of the sleeve rotatively supporting the front end of the drill carrying spindle, a spring exerting a rearward pressure on the said lever, and anti-frictional bearings adapted to take the end pressure on the spindle during boring operations.

6. In a boring machine, the combination of a main frame, a hollow shaft mounted longitudinally in the lower part of the main frame of the machine, an oscillatable lever pivoted on the hollow shaft, a bit carrying spindle rotatively and reciprocatingly supported in the upper end of the oscillatable lever, a rod slidably mounted in the said hollow shaft, a belt shifting fork supported by the said rod, and means for imparting a reciprocating movement to the said rod comprising a slot in the side of the tubular shaft, a stud projecting from the rod through the said slot, a link connection between the stud and an arm on a rock bar carried by the main frame, and a foot operated lever for rocking the said shaft to cause the belt striking fork to move the belt from the loose pulley to the driving pulley and vice versa.

7. In a boring machine the combination of, a main frame, a transversely movable member on the main frame, a bit carrying spindle rotatively and reciprocatingly mounted on the transversely movable member, a bracket adapted to slide vertically in guides on the front of the main frame, a work table pivotally supported on the upper part of the bracket, means for retaining the table rigidly in position while a hole is being bored, and means for retracting the bit carrying spindle after a hole is bored and for releasing the retaining means whereby the table will move downwardly a predetermined distance to enable a second hole to be bored on the next forward movement of the spindle at a higher elevation than the first mentioned hole.

8. In a boring machine the combination of, a main frame, a transversely movable member on the main frame, a bit carrying spindle rotatively and reciprocatingly mounted on the transversely movable member, a bracket adapted to slide vertically in guides on the front of the main frame, a work table supported on the upper part of the bracket, a screwed rod having its upper end revolvably secured to the reciprocable bracket on the front of the main frame, a sleeve having a screw engagement with the said rod and having its lower end adapted to reciprocate in a hole formed in a bracket fitted to the front of the main frame, a compression spring surrounding the sleeve and adapted to exert an upward pressure thereon, a flange on the upper end of the said sleeve, a rod having its upper end fitted to the rear part of the flange and its lower end adapted to reciprocate in a hole in the said bracket, an adjustable stop pin mounted on the opposite side of the said screwed rod and adapted to limit the downward movement of the same, a reduced lower end or shoulder on the rod fitted to the flange on the rear of the sleeve, adjustment nuts on the lower end of the reduced portion of the rod adapted to limit the upward movement of the said sleeve, a bolt adapted to engage a shoulder on the rod and to prevent any downward movement of the sleeve and table, a spring acting on the bolt to maintain it in its locked position, and adjustable connections between the said bolt and a lever for operating the drill carrying spindle or sleeve surrounding the front end of the same whereby after a hole has been bored and the said spindle is moved in a rearward direction the bolt will be released and the sleeve together with the brackets and table will be allowed to move downwardly to place the work in position for boring a hole at a higher elevation.

9. In a boring machine as claimed in claim 8, a centrally pivoted lever on the oscillating lever carrying the boring spindle, a link connecting the bolt to the lower part of the first mentioned lever, and a loose or "lost motion" connection between the upper end of the said lever and a depending portion of an operating lever for reciprocating the boring spindle.

10. In a boring machine, a main frame, a lever or arm supporting a bit carrying spindle at its upper end and having its lower end supported whereby its upper end can be oscillated from side to side, stops or abutments on the main frame for limiting the oscillating movement of the said lever or arm, and compression springs and a rod or rods for maintaining the said lever or arm normally in a vertical position.

11. In a boring machine, a main frame, a lever or arm supporting a bit carrying spindle at its upper end and having its lower end supported whereby its upper end can be oscillated from side to side, compression springs and a rod or rods for maintaining the said lever or arm normally in a vertical position, horizontal racks fitted to the lower part of the main frame, curved racks formed on the lower end of the lever or arm and having their teeth engaging the teeth of the horizontal racks, constructed and arranged whereby the boring spindle supported in the upper end thereof will move through a horizontal path when the said lever or arm is oscillated.

12. In a boring machine the combination of, a main frame, an oscillatable member, a table in front of the oscillatable member, bearings on the oscillatable member for supporting a reciprocable drill carrying spindle having a bit secured to the forward end thereof, a sleeve fitted to and surrounding the spindle and supported non-rotatively in one of the bearings of the oscillatable member, a feather or key disposed longitudinally on the sleeve, brackets extending rearwardly and upwardly from the front of the main frame to a point in line with the top of the sleeve revolvably supporting the boring spindle, studs on the upper ends of the said brackets, a gauge bar having forwardly opening jaws in its ends adapted to engage the screwed studs on the upper ends of the rackets, clamping nuts for securing the gauge bar rigidly on the screwed studs, and one or more slots formed on the underside of the gauge bar having their rear ends flared outwardly whereby the feather on the said sleeve will readily engage and pass through the said slot or slots when the spindle is reciprocated to bore holes in the work.

13. In a boring machine, a main frame, a table pivotally supported at its rear edge to a bracket supported in vertical guides on the main frame, slots in the top of the table, depressible pins projecting upwardly through the slots and having their lower ends supported in bosses formed on the ends of cross bars mounted on rods supported transversely beneath the table, resilient members fitted to the said cross bars and exerting an upward pressure on the depressible pins, and means for securing the transverse rods in adjusted positions to retain the depressible pins in desired positions above the table.

14. In a boring machine the combination of, a main frame, a table pivotally supported at its rear edge to a bracket supported in vertical guides on the main frame, slots in the top of the table, depressible pins projecting upwardly through the slots and having their lower ends supported in bosses formed on the ends of cross bars mounted on rods supported transversely beneath the table, resilient members fitted to the said cross bars and exerting an upward pressure on the depressible pins, inwardly and downwardly bevelled inner ends in the slots formed in the table constructed and arranged whereby the pins may be readily depressed and passed beneath the portion of the table between the adjacent inner ends of each pair of slots when the cross members are thrust inwardly by the transverse rods.

15. In a boring machine, an adjustable work supporting table, a fence secured to the back of the table, a clamping device comprising a metal block having a recess adapted to slidably engage the fence, a set screw adapted to secure the block to the said fence, a pin slidably mounted in a bore in the said block and having its front end projecting across the table, a flange on the rear end of the pin extending into a larger bore in the rear part of the block, a screwed plug in the rear end of said larger bore, and a compression spring bearing against and exerting a forward pressure on the said pin.

16. In a boring machine, an adjustable work supporting table, a fence secured to the back of the table, a clamping device comprising a block adapted to fit over and be clamped to the fence, a bore in said block adapted to receive a depressible pin, a reduced extension projecting axially from the rear of the said pin and provided with a head on the end thereof, a spring acting against the shoulder on the pin to maintain it in a forward position, a circumferential groove in the said pin, and a bore at right angles to the pin housing a spring and ball for retaining the pin in its depressed position.

17. In a boring machine, a work supporting table, a fence secured to the back of the table, a block adapted to be clamped to the fence, a bar having its rear ends cranked and pivotally mounted in the said block, the said bar projecting forwardly across the table, a block adjustably secured to the pivoted portion of the bar, and an abutment member adjustably secured to the said bar, substantially as described.

In testimony whereof I affix my signature.

ERNEST GEORGE LACEY.